United States Patent
Lofthouse et al.

(10) Patent No.: US 11,265,345 B2
(45) Date of Patent: Mar. 1, 2022

(54) SERVER DETECTION OF LEAKED CREDENTIALS OVER HTTP

(71) Applicant: Red Hat, Inc., Raleigh, NC (US)

(72) Inventors: Darran Lofthouse, Farnborough (GB); Farah Juma, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 245 days.

(21) Appl. No.: 16/533,616

(22) Filed: Aug. 6, 2019

(65) Prior Publication Data
US 2021/0044618 A1    Feb. 11, 2021

(51) Int. Cl.
H04L 29/06    (2006.01)
H04L 9/32    (2006.01)

(52) U.S. Cl.
CPC ........ H04L 63/1475 (2013.01); H04L 9/3226 (2013.01); H04L 63/083 (2013.01); H04L 63/102 (2013.01)

(58) Field of Classification Search
CPC . H04L 63/10–1491; H04L 63/08–0892; H04L 9/3226
See application file for complete search history.

(56) References Cited

U.S. PATENT DOCUMENTS

| 5,604,803 | A  | * | 2/1997 | Aziz | ........................ G06F 21/31 709/228 |
|---|---|---|---|---|---|
| 8,078,870 | B2 |   | 12/2011 | Nanda et al. | |
| 8,850,545 | B2 |   | 9/2014 | Cha et al. | |
| 9,356,951 | B2 |   | 5/2016 | Beiter | |
| 9,374,349 | B1 | * | 6/2016 | Corlett | ................... G06F 21/335 |
| 2002/0004832 | A1 | * | 1/2002 | Yoon | ................... H04L 63/0807 709/229 |
| 2010/0077467 | A1 | * | 3/2010 | Satagopan | .............. G06F 21/41 726/7 |
| 2012/0254935 | A1 |   | 10/2012 | Yato et al. | |
| 2020/0084216 | A1 | * | 3/2020 | North | .................... H04L 63/083 |

FOREIGN PATENT DOCUMENTS

KR    101294280 B1    8/2013

OTHER PUBLICATIONS

IBM, "Providing Credentials in HTTP Requests", located at https://www.ibm.com/support/knowledgecenter/en/SSMKHH_10.0.0/com.ibm.etools.mft.doc/bp19260_.htm, downloaded May 29, 2019, 4 pages.

(Continued)

Primary Examiner — Madhuri R Herzog
(74) Attorney, Agent, or Firm — Womble Bond Dickinson (US) LLP

(57) ABSTRACT

In some implementations, systems and methods for detecting leaked credentials in a request for a network resource are provided. A request to access a resource on a network is analyzed to determine if the request was transmitted using an unsecured protocol, and if so, determine whether the request includes authentication credentials. If the request includes authentication credentials, the authentication credentials are authenticated and in response to determining that the authentication credentials are authentic, the authentication credentials are disabled. One or more notifications may be transmitted to an owner of the disabled authentication credentials.

20 Claims, 5 Drawing Sheets

(56) References Cited

OTHER PUBLICATIONS

Fielding et al., "Security Considerations", located at https://www.w3.org/Protocols/rfc2616/rfc2616-sec15.html, downloaded May 29, 2019, 4 pages.
Huber et al., "Tor HTTP Usage and Information Leakage" Vienna University of Technology, Austria; Secure Business Austria, CMS 2010, LNCS 6109, pp. 245-255, published 2010, located at https://link.springer.com/content/pdf/10.1007%2F978-3-642-13241-4_22.pdf.

* cited by examiner

| Username | Password |
|----------|----------|
| User 1 | 1234 |
| User 2 | abcd |
| User 3 | 5678 |
| User 4 | efgh |

SERVER DETECTION OF LEAKED CREDENTIALS OVER HTTP

BACKGROUND

A network or data center may include a number of components (e.g., network devices, computing devices, an application running on a computing device or network device etc.) capable of communicating data with other components through a wired or wireless connection or set of connections. For example, a network device may receive data from a first device e.g., a first computing device, a first switch, a first router, etc. and may forward the data to a second device (e.g., a second computing device, a second switch, a second router, etc.). A computing device of a network may host one or more resources (e.g., applications, web sites, data storage etc.) to perform various functions and tasks. Such resources are often times accessed by other network components (e.g., other applications or computing devices) using a transmission protocol such as the hypertext transfer protocol (HTTP) or the more secure hypertext transfer protocol over secure socket layer (HTTPS).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2 is a diagram of an identity repository, in accordance with some embodiments of the present disclosure.

DETAILED DESCRIPTION

Figure 1:
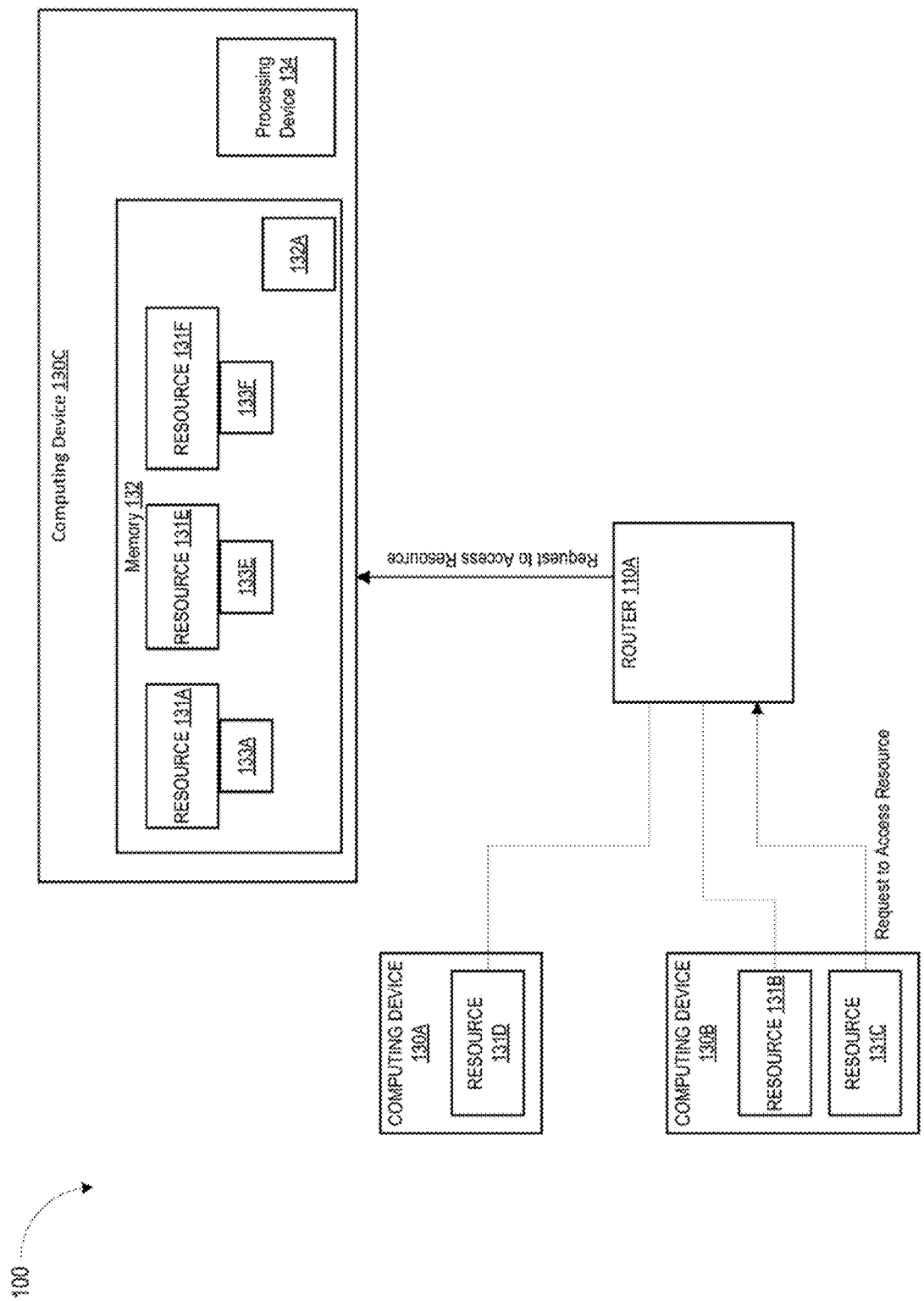
FIG. 1 is a block diagram illustrating an example of a network architecture, in accordance with some embodiments of the present disclosure.

A network may include a number of components (e.g., a computing device, a network device, virtual machines, applications, etc.) that may communicate data with other components in the network (e.g., may receive data from a first component and may forward the data to a second component) as well as components outside of the network. Components in a network are often accessed using the hypertext transfer protocol (HTTP) or the more secure hypertext transfer protocol over secure socket layer (HTTPS). For a server accessed using the HTTP protocol, there are two common sequences of message exchange which are both used to provide optimized secure access to resources hosted by the server. When accessing, a server over HTTP, if a secure resource is being accessed or if the client is submitting sensitive information with the request (e.g., authentication credentials such as username and password) in response to an authentication challenge, the server may redirect the client to use HTTPS to ensure all communication is encrypted, thereby preventing eavesdropping and potential exposure of sensitive information. In addition, where authentication is required to access a resource a client may submit a request to access the resource and the server may respond with a challenge to the client to repeat the request with authentication information. However, this request/challenge/request flow of authentication results in an additional remind trip to the server, which uses additional resources. This problem is exacerbated in situations where the request is large, thus rendering a second submission even more costly. To compensate, some clients may proactively send the authentication credentials in each request to prevent the wasted round trip. However, where a client is incorrectly HTTP for their request, this "optimiziation" can have a side effect of submitting authentication credentials in the clear (i.e. unsecured) over HTTP before being redirected to use HTTPS.

Systems that perform passive network monitoring may detect when authentication credentials have been leaked, but such systems rely on generating reports or alerts that must be reviewed by a user/administrator, who may then decide what action should be taken. This process can require a significant amount of time, during which leaked authentication credentials can be used for malicious purposes, instead of preventative action being taken immediately.

Aspects of the present disclosure address the above noted and other deficiencies by using a processing device to determine whether a request to access a resource was transmitted using an unsecured protocol, and if so, determine whether the request includes authentication credentials. If the request includes authentication credentials, the processing device may determine whether the authentication credentials are authentic. In response to determining that the authentication credentials are authentic, the processing device may determine that valid authentication credentials have been leaked from an unsecure transmission and may automatically disable the authentication credentials. The processing device may transmit one or more notifications to an owner of the disabled authentication credentials.

FIG. 1 is a block diagram of a network architecture 100 in accordance with some embodiments of the present disclosure. Network architecture 100 may be a public network (e.g., the internet), a private network (e.g., a local area network (LAN) or wide area network (WAN)), or a combination thereof. In one embodiment, network architecture 100 may include a wired or a wireless infrastructure, which may be provided by one or more wireless communications systems, such as a WiFi™ hotspot connected with the network architecture 100 and/or a wireless carrier system that can be implemented using various data processing equipment, communication towers cell towers), etc. The network architecture 100 may also include various components such as switches, routers, bridges, gateways, servers, computers, cables, virtual machines, integrated circuits, etc. The network architecture 100 may carry communications (e.g., data, messages, packets, frames, etc.) between computing devices 130A-130C and any other components of network architecture 100.

As illustrated in FIG. 1, network architecture 100 includes a router 110A and computing devices 130A-C. Computing devices 130A and 130B may each include one or more resources 131B-D. Computing device 130C may include one or more resources 131A, 131E and 131F. A resource may be an application, a web page of a website etc. A computing device 130 and/or a resource 131 of the computing device 130 may transmit data (e.g., messages, frames, packets, etc.) to other devices (e.g., other computing devices 130) via router 110A, and/or may receive data from other devices via router 110A.

In one embodiment, each computing device 130 may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing devices 130 may comprise any suitable type of computing device or machine that has a programmable processor including, for example, server computers, desktop computers, laptop computers, tablet computers, smartphones, set-top boxes, etc. In some examples, each of the computing devices 130 may be a single machine or may include multiple interconnected machines (e.g., multiple computers configured in a cluster). In another embodiment, one or more of computing devices 130 may be a virtual machine (VM). A VM may be an emulation of a computing device. The VM may execute on a hypervisor (not shown) which executes on top of an operating system for a host computing device. The hypervisor may manage system resources (e.g., may manage access to hardware devices, such as processors, memory, storage devices, etc., of the host computing device). The hypervisor may also emulate the hardware (or other physical resources) which may be used by the VMs to execute software and/or applications. As illustrated in FIG. 1, computing devices 130 may each include one or more resources 131. A resource 131 may be a program (e.g., a computer program), software, etc., that may execute on a computing device 130 to perform various functions, tasks, operations, etc. For example, a resource 131 may be a website, a page of a website, or an application (e.g., an application that uses network tracing, such as micro-services applications, inter-node communication applications and development tools among others). Examples of resources 131 include, but are not limited to, a messaging application, a video application, a social networking application, a video sharing application, a photo sharing application, a chat application, a content (e.g., video, music, etc.) delivery application, a web browser, a media player, a gaming application (e.g., a video game), etc.

As discussed above, the computing devices 130 and/or the resources 131 may transmit packets to and/or receive packets from other components of the network architecture 100 via the router 110A. A packet (or message, frame, etc.) may include multiple portions. For example, a packet may include a packet header (also referred to as a header), a packet footer (also referred to as a footer) and a payload. The payload may include a request (e.g., an HTTP request) to access a resource 131. The packet header may include information such as a source address and a destination address, and the header of the HTTP request may include authentication credentials such as a username and password. A source address may be data (e.g., a value, a number, etc.) that may indicate the sender of the packet. For example, a source address may be an Internet Protocol (IP) address of a computing device 130 that transmitted the packet. A destination address may be data (e.g., a value, a number, etc.) that may indicate a recipient of the packet. For example, a destination address may be an Internet Protocol (IP) address of a receiving computing device. The packet header may also include information such as a source port and a destination port.

In one embodiment, a network device (such as a router 110A) may include multiple processing cores or may have access to multiple processing cores (e.g., may be able to use multiple processing cores for processing packets). A processing core may refer to separate processing devices (e.g., separate central processing units (CPUs), separate processors, etc.) or may refer to a single core of a processing device that has multiple cores (e.g., a single core of a multi-core CPU). It may be beneficial for the network device to use multiple processing cores for processing packets rather than a single processing core. For example, if flows (e.g., groups, streams, sets, etc.) of packets are received from each of the resources 131 illustrated in FIG. 1, the network device would be able to process the different flows of packets more quickly if a different processing core was used to process each flow of packets. This may allow the network device to process the six flows of packets simultaneously using six different processing cores (which decreases the amount of time it takes the networking device to process the six flows of packets). This may also allow the network device to parallelize the processing of the flows of packets. Various techniques such as receive side scaling (RSS) and receive packet steering (RPS) may be used to distribute packets (received by a networking device) to different processors and/or processing cores. Generally, these techniques (e.g., RSS, RPS, etc.) use the source address of packets to determine how to distribute the packets among the different processors and/or processing cores.

Each computing device 130 in the network architecture 100 may utilize encapsulation across the various layers of the network stack when transmitting packets (e.g., requests for resources) elsewhere on the network architecture 100. For example, resource 131C may issue a request to view a web page from resource 131A, which in this example may be a website hosted on computing device 130C (which may be a web server). From an application level perspective, resource 131C may generate a request for the particular web page hosted on computing device 130C. As the request corresponds to the application layer of the network stack, in order for the request to reach computing device 130C, the request needs to be encapsulated across the various layers of the model. In some embodiments, the computing device 130B may append for example, HTTP headers to the request and then encapsulate the request in a TCP header (the TCP protocol corresponding to the transport layer), and then an IP header (the IP protocol corresponding to the internet/network layer), and then generate an Ethernet frame (the Ethernet protocol corresponding to the physical layer), at which point computing device 130B may transmit the Ethernet frame to computing device 130C via router 110A (as discussed above). In this way, an application on a computing device may send a request(s) to access resources on another computing device within the network architecture 100. Although described using the TCP/IP network stack model, any appropriate network stack model (e.g., OSI) may be utilized.

Although the present disclosure may refer to HTTP, HTTPS etc., other embodiments may use other communication channels and other types of packets. For example, TLS channels/connections, virtual private network (VPN) channels/connections, virtual extensible LAN (VXLAN) channels/connections, etc., may be used. In addition, although while the present disclosure may refer to and/or illustrate routers, the embodiments are not meant to be limiting as other types of network devices such as a switch, a gateway, a bridge, etc., may perform the methods, functions, operations, etc., described herein. Furthermore although three computing devices 130A-C and six resources 131A-F are illustrated in FIG. 1, it shall be understood that in other embodiments, any number of computing devices and/or resources (i.e. components of the network) may be used in the network architecture 100.

Computing device 130C may include memory 132 and processing device 134. Memory 132 may further include (along with resources 131) a request interceptor software module 132A (hereinafter module 132A), and security domains 133A, 133E and 133F. Each security domain 133 may be associated with a particular resource (e.g., 131A, 131E and 131F respectively) and may be configured with access to a repository of identities (IDs) (not shown) which it may use to authenticate requests to access that particular resource. In some embodiments, each security domain 133 may be configured with access to a repository of IDs that is associated with that particular security domain. In other embodiments, each security domain 133 may be configured with access to a repository of IDs that is common to each security domain 133. Although illustrated as software modules stored in memory 132, in some embodiments, any one or more of resources 131, module 132A and security domains 133 may be implemented as firmware in processing device 134. In some embodiments, these software modules may be separate from the processing device 134 (e.g., may be a separate circuit, field programmable gate array (FPGA), application specific integrated circuit: (ASIC), a process running on another processing device, etc.) Although described with respect to a security domain 133, any appropriate component for performing authentication may be utilized such as a security realm, identity store etc.

Upon receiving a packet including a request for a resource 131 (e.g., a web page from resource 131A), computing device 130C may decapsulate the request and execute module 132A in order to intercept the request and perform a series of checks on the request to determine if it includes authentication credentials that have been leaked over an unsecure transmission protocol. The request may be sent to computing device 130C by resource 131B, running on computing device 130B, for example. Computing device 130C may examine the headers of the request during decapsulation and determine whether the request was sent over a clear (unsecured) transport protocol. For example, computing device 130C may determine whether the request was sent using HTTP (as opposed to HTTPS) by verifying if a secure socket layer (SSL) session has been established and is in use for the connection. Computing device 130C may then determine if the request includes any authentication credentials. Authentication credentials may be any suitable credential such as a username and password, a token(s) or other appropriate credential. For example, computing device 130C may examine the (e.g.) HTTP header(s) of the request for any authentication credentials such as a username and password. In some embodiments, computing device 130C may examine the body of the request to detect authentication credentials such as a token(s). If computing device 130C determines that the request was sent over an unsecure transport protocol and that the request contains authentication credentials, computing device 130C may then attempt to authenticate the authentication credentials. In some embodiments, computing device 130 may instruct security domain 133A (associated with the requested resource— resource 131A) to attempt to match the authentication credentials in the intercepted request to an identity from a repository of identities associated with the requested resource as discussed further herein.

Each resource (e.g., 131A, 131E and 131F) may have a corresponding security domain 133. Each security domain 133 may include configurations for authentication, verification, authorization, security mapping, and auditing. For authentication, each security domain 133 may be configured with access to a corresponding repository of identities (not shown). The repository may comprise any appropriate repository such as a database, lightweight directory access protocol (LDAP) server, properties file, etc. In some embodiments, each security domain 133 is configured with access to a common repository of identities that is shared among all security domains 133. Each identity in the repository may include an expected set of credentials corresponding to that identity. FIG. 2 illustrates an example of an identity repository 200. The repository 200 may have the authentication credentials in the form of a user name and password for 4 different identities. Each identity may correspond to a user or a particular computer/machine associated with the resource etc. Referring back to FIG. 1, computing device 130C may use a security domain 133A corresponding to the requested resource (131A) to determine whether the authentication credentials from the intercepted request match the expected credentials for a particular identity in the repository. This is in contrast to systems that employ passive network monitoring which may not be able to determine which security domain to use for authentication, which is a significant drawback that embodiments of the present disclosure overcome. In addition, using matching to verify the authentication credentials prevents malicious users from sending bogus authentication credentials with the purpose of getting a user's account/credentials locked or otherwise disabled. Security domains also include the permissions assigned to an identity to give them rights to perform certain actions within the associated resource.

Continuing the example above, computing device 130C may instruct security domain 133A to authenticate the username and password included in the request. Computing device 130C (via security domain 133A) may determine whether the username and password match the expected credentials for a particular identity in a repository of identities identity repository 200 illustrated in FIG. 2) associated with the requested resource. For example, computing device 130C may identify the identity by looking it up using the username and then verify the password for that username. If there is no match, computing device 130C may determine that the intercepted authentication credentials were not authentic, and therefore no sensitive information has been leaked. If however, the security domain 133A finds a match (authenticates the intercepted credentials), then computing device 130C may determine that useable authentication information has been leaked in a clear/unsecure transmission. For example, the username and password extracted from the request may be "User 2" and "abed" respectively. Security domain 133A may look up User 2 in the repository 200 and match the extracted password to the corresponding password for User 2 ("abed") in the repository 200. Thus, computing device 130C may determine that the authentication credentials from the intercepted request (e.g., the username and password) match User 2 and the corresponding password ("abed") as shown in FIG. 2. As a result, computing device 130C may determine that the intercepted credentials are authentic (i.e. do correspond to an identity associated with the request) and that preventative action should be taken as discussed in further detail herein.

Upon determining that useable authentication information has been leaked in a clear/unsecured transmission, computing device 130C (via module 132A) may instruct the security domain 133A to take preventative actions including automatically disabling the leaked authentication credentials (i.e., without waiting for user review/input). The preventative actions may be based on a set of policies included in the security domain 133A that define what actions should be taken. More specifically, computing device 130C may automatically update the repository of identities to disable the identity whose credentials matched the intercepted authentication credentials. In this way, computing device 130C may disable the leaked authentication credentials thereby locking the account associated with the credentials. By automatically disabling the leaked authentication credentials instead of waiting for review by a user/administrator, computing device 130C may prevent the opportunity for malicious usage of the credentials. In addition, the computing device 130C may send a notification to the owner of the credentials indicating that a leak of their authentication credentials occurred. The notification may include other information as well such as the date and time the leak was detected, a source and destination device of the request containing the authentication credentials (e.g., the IP address of computing device 130B and computing device 130C respectively) and the resource that was being requested, among others. The notification may also inform the owner that their authentication credentials have been disabled and request that the owner reset their credentials (e.g., username and/or password) in order to re-enable them. The notification may be in the form of an email to the email address associated with the account, a text message to a phone number associated with the account, an instant message via a chat program, or any other appropriate method. In some embodiments, computing device 130C may send such notifications to an owner of the domain in addition to or alternative to sending the notifications to the owner of the account. From the perspective of the requesting device (computing device 130B), the message exchange flow continues as normal e.g., with a redirect to use HTTPS. However, computing device 130B will receive an "Authentication Failure" error in response to resending the credentials via HTTPS as leaking the authentication information has the side effect of disabling it.

In some embodiments, upon determining, that the authentication credentials are not authentic (e.g., do not match the credentials for any of the identities in the identity repository associated with the requested resource), computing device 130C may continue processing the request as normal. For example, computing device 130C may redirect the resource 131B to resend the request using a secure transport protocol (e.g., HTTPS) or take any other appropriate steps to process the request for the resource normally.

In some embodiments, the leaked authentication credentials may comprise a token. However, a user account may have multiple tokens associated with it, where each token may grant access to a different resource. Thus, security domain 133A may disable that specific token instead of disabling the owner's entire account. In addition, the computing device 130C may send a notification to the account owner indicating that a leak of their authentication credentials occurred. The notification may contain other information as well such as the date and time the leak was detected, a source and destination device of the request containing the authentication credentials (e.g., the IP address of computing device 130B and computing device 130C respectively) and the resource that was being requested, among others. The notification may also inform the owner that the token has been disabled and that they must reset the token in order to re-enable it. For example, the notification may request the owner to request a new token which may be provided to an email address associated with the account/credentials. Any other appropriate means of resetting the credentials may be implemented. The notification may be in the form of an email to the email address associated with the account, a text message to a phone number associated with the account, an instant message via a chat program, or any other appropriate method.

In some embodiments, upon detecting leaked credentials, computing device 130C may disable all of the tokens associated with the account and request that the owner of the account request a reset of all tokens associated with the account/credentials.

Figure 3:
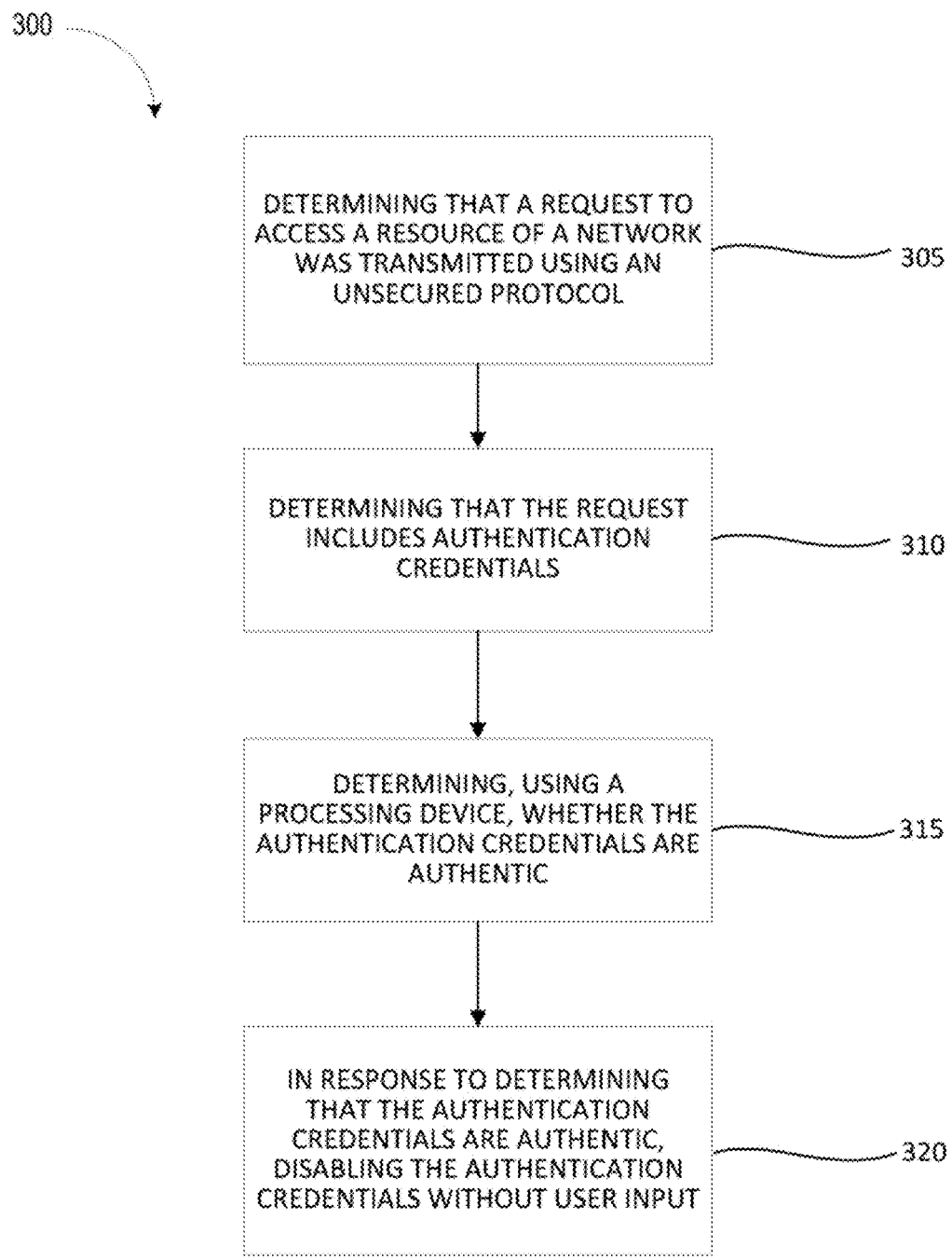
FIG. 3 is a flow diagram of a method, in accordance with some embodiments of the present disclosure.

FIG. 3 is a flow diagram illustrating a method 300 for detecting leaked authentication credentials in accordance with some embodiments of the present disclosure. Method 300 may be performed by processing logic that may comprise hardware (e.g., circuitry, dedicated logic, programmable logic, a processor, a processing device, a central processing unit (CPU), a system-on-chip (SoC), etc.), software e.g., instructions running/executing on a processing device), firmware (e.g., microcode), or a combination thereof. In some embodiments, the method 300 may be performed by a computing device (e.g., computing device 130C illustrated in FIG. 1).

At block 305, computing device 130C may determine that a request to access a resource was sent over an unsecured protocol. The request may be sent to computing device 130C by resource 131B, running on computing device 130B, for example. Computing device 130C may decapsulate the request and determine whether the request was sent over a clear (unsecured) transport protocol. For example, computing device 130C may determine whether the request was sent using HTTP (as opposed to HTTPS) by verifying if a secure socket layer (SSL) session has been established and is in use for the connection. At block 310, computing device 130C may determine whether the request includes authentication credentials. For example, computing device 130C may examine the HTTP header(s) of the request for any authentication credentials such as a username and password. In some embodiments, computing device 130C may examine the body of the request to detect credentials such as a token(s). If computing device 130C determines that the request was sent over a clear (unsecured) transport protocol and that the request contains authentication credentials, then at block 315, computing device 130C may determine whether the authentication credentials included in the request are authentic. In some embodiments, computing device 130 may instruct security domain 133A (associated with the requested resource—resource 131A) to attempt to match the authentication credentials in the intercepted request to an identity from a repository of identities associated with the requested resource as discussed further herein.

Figure 4:
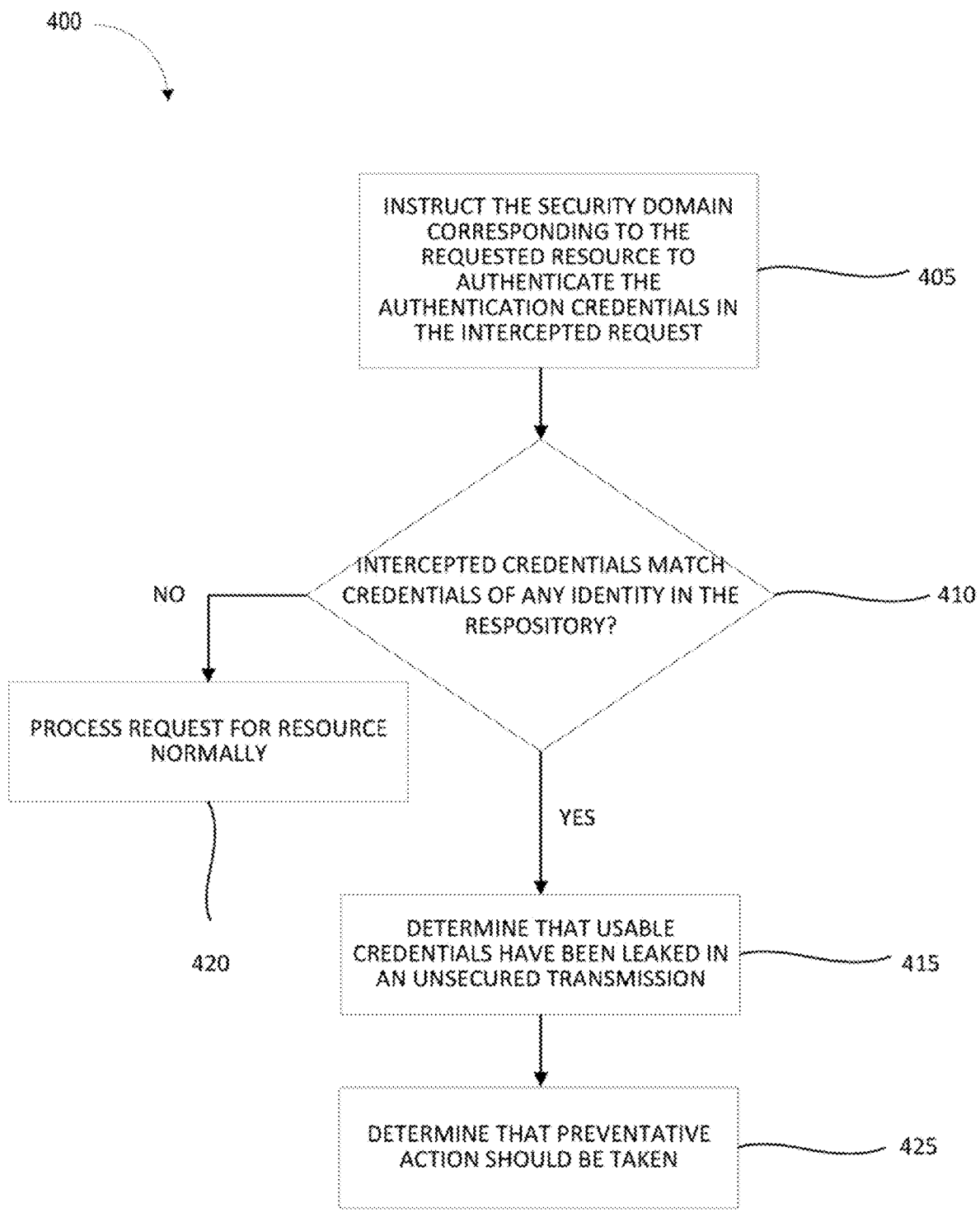
FIG. 4 is a flow diagram of a method, in accordance with some embodiments of the present disclosure.

FIG. 4 is a flow diagram illustrating a method 400 for authenticating credentials contained in a request for a resource in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 130C illustrated in FIG. 1).

At block 405, computing device 130C may instruct security domain 133A to authenticate the credentials included in the request. More specifically, computing device 130C (via the security domain 133A) may determine whether the authentication credentials in the intercepted request match the expected credentials for an identity in a repository of identities (e.g., identity repository 200 illustrated in FIG. 2) associated with the requested resource to determine whether the authentication credentials from the intercepted request match the expected credentials for a particular identity associated with the requested resource. Each resource (e.g., 131A, 131E and 131F) may have a corresponding security domain 133. Each security domain 133 may include configurations for authentication, verification, authorization, security mapping, and auditing. For authentication, each security domain 133 may be configured with access to a corresponding repository of identities (not shown). The repository may comprise any appropriate repository such as a database, lightweight directory access protocol (LDAP) server, properties file, etc. In some embodiments, each security domain 133 is configured with access to a common repository of identities that is shared among all security domains 133. Each identity in the repository may include an expected set of credentials corresponding to that identity. FIG. 2 illustrates an example of an identity repository 200. The repository 200 may have the authentication credentials in the form of a user name and password for 4 different identities. At block 410, computing device 130C may determine whether the authentication credentials in the intercepted request match the expected credentials for any identity in the repository 200. For example, if the intercepted authentication credentials comprise a username and password, computing device 130C may attempt to authenticate the credentials by looking up the username in the repository 200 and then verifying the intercepted password against the password stored in repository 200 for that username. Each identity in the repository may correspond to a user or a particular computer/machine associated with the resource etc. Computing device 130C may use a security domain 133A corresponding to the requested resource (131A) to determine whether the authentication credentials from the intercepted request match the expected credentials for a particular identity in the repository. This is in contrast to systems that employ passive network monitoring which may not be able to determine which security domain to use for authentication, which is a significant drawback that embodiments of the present disclosure overcome. In addition, using matching to authenticate the authentication credentials prevents malicious users from sending bogus authentication credentials with the purpose of getting a user's account/credentials locked or otherwise disabled. Security domains also include the permissions assigned to an identity to give then rights to perform certain actions within the associated resource.

If there is no match, then at block 420 Computing device 130C may continue to process the request normally. Computing device 130C may determine that the intercepted authentication credentials are not authentic, and therefore no sensitive information has been leaked. Therefore, computing device 130C may determine that there is no risk in continuing to process the request as normal. If however, the computing device 130C finds a match (i.e. authenticates the intercepted credentials), then at block 415 computing device 130C may determine that useable authentication credentials have been leaked in a clear/unsecure transmission. For example, the username and password extracted from the request may be "User 2" and "abcd" respectively. Computing device 130C may look up User 2 in the repository 200 and compare the password stored for User 2 in the repository 200 to the password in the intercepted authentication credentials in order to determine if there is a match. Computing device 130C may determine that the authentication credentials from the intercepted request (e.g., the username and password) match User 2 and the corresponding password ("abcd") as shown in FIG. 2. As a result, computing device 130C may determine that the intercepted credentials do correspond to an identity associated with the request and at block 425, computing device 130C may determine that preventative action (e.g., disabling credentials) should be taken as discussed in further detail herein.

Referring back to FIG. 3, at block 320, in response to determining that the authentication credentials are authentic, computing device 130C may automatically disable the authentication credentials (i.e., without waiting for user review/input). Stated differently, upon determining that useable authentication information has been leaked in a clear/unsecured transmission, computing device 130C may automatically instruct the security domain 133A to take preventative actions including disabling the leaked authentication credentials. The preventative actions may be based on a set of policies included in the security domain 133A that define what actions should be taken. More specifically, computing device 130C may automatically update the repository of identities to disable the identity whose credentials matched the intercepted authentication credentials. In this way, computing device 130C may disable the leaked authentication credentials thereby locking the account associated with the credentials. By automatically disabling the leaked authentication credentials instead of waiting for review by a user/administrator, computing device 130C may prevent the opportunity for malicious usage of the credentials. In addition, the computing device 130C may send a notification to the owner of the credentials indicating that a leak of their authentication credentials occurred. The notification may include other information as well such as the date and time the leak was detected, a source and destination device of the request containing the authentication credentials (e.g., the IP address of computing device 130B and computing device 130C respectively) and the resource that was being requested, among others. The notification may also inform the owner that their authentication credentials have been disabled and request that the owner reset their credentials (e.g., username and/or password) in order to re-enable them. The notification may be in the form of an email to the email address associated with the account, a text message to a phone number associated with the account, an instant message via a chat program, or any other appropriate method. In some embodiments, computing device 130C may send such notifications to an owner of the domain in addition to or alternative to sending the notifications to the owner of the account.

In some embodiments, upon determining that the authentication credentials are not authentic (e.g., do not match the credentials for any of the identities in the identity repository associated with the requested resource), computing device 130C may continue processing the request as normal. For example, computing device 130C may redirect the resource 131B to resend the request using a secure transport protocol (e.g., HTTPS) or take any other appropriate steps to process the request for the resource normally.

In some embodiments, the leaked authentication credentials may comprise a token. However, a user account may have multiple tokens involved with it, where each token may grant access to a different resource. Thus, computing device 130C may disable that specific token instead of disabling the owner's entire account. In addition, the computing device 130C may send a notification to the account owner indicating that a leak of their authentication credentials occurred. The notification may contain other information as well such as the date and time the leak was detected, a source and destination device of the request containing the authentication credentials (e.g., the IP address of computing device 130B and computing device 130C respectively) and the resource that was being requested, among others. The notification may also inform the owner that the token has been disabled and that they must reset the token in order to re-enable it. For example, the notification may request the owner to request a new token which may be provided to an email address associated with the account/credentials. Any other appropriate means of resetting the credentials may be implemented. The notification may be in the form of an email to the email address associated with the account, a text message to a phone number associated with the account, an instant message via a chat program, or any other appropriate method. In some embodiments, computing device 130C may send such notifications to an owner of the domain in addition to or alternative to sending the notifications to the owner of the account.

In some embodiments, upon detecting leaked credentials, computing device 130C may disable all of the tokens associated with the account and request that the owner of the account request a reset of all tokens associated with the account/credentials.

Figure 5:
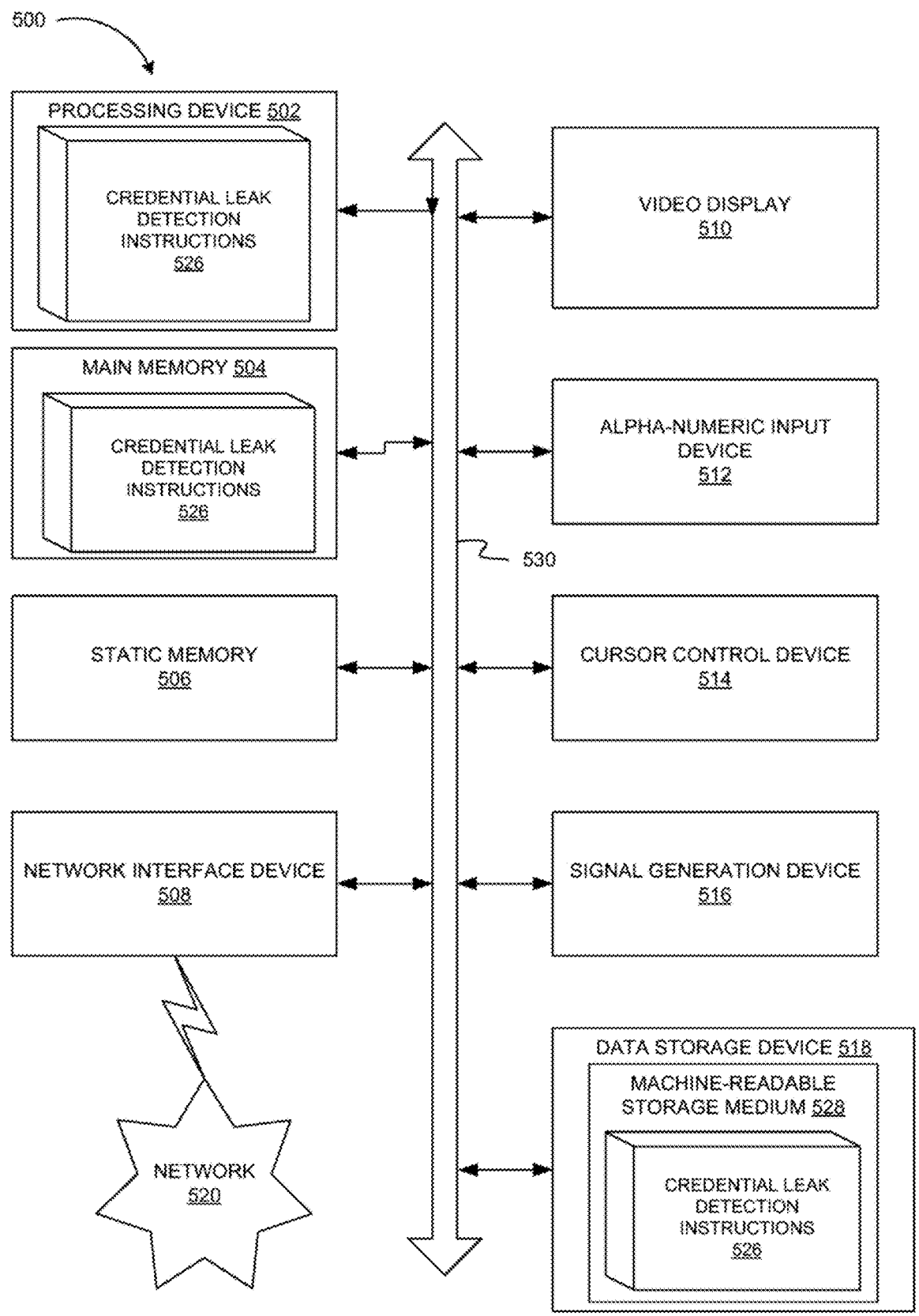
FIG. 5 is a block diagram of an example computing device, in accordance with some embodiments of the present disclosure.

FIG. 5 illustrates a diagrammatic representation of a machine in the example form of a computer system 500 within which a set of instructions, for causing the machine to perform any one or more of the methodologies discussed herein for detecting leaked credentials over an unsecured protocol. More specifically, the machine may determine whether a request to access a resource was sent over an unsecured protocol, and if so, determine whether the request includes authentication credentials. If the request includes authentication credentials, the machine may determine whether the authentication credentials are authentic and in response to determining that the authentication credentials are authentic, may disable the authentication credentials. The machine may transmit one or more notifications to an owner of the disabled authentication credentials.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a serer, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server, such as DSL server 110 configured to perform multi-level task debugging.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute credential leak detection instructions 526, for performing the operations and steps discussed herein.

The data storage device 518 may include a machine-readable storage medium 528, on which is stored one or more sets of credential leak detection instructions 526 (e.g., software) embodying any one or more of the methodologies of functions described herein, including instructions to cause the processing device 502 to execute scripts 121A shown in FIG. 1. The credential leak detection instructions 526 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for object analysis/validation event publishing, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
   determining that a request to access a resource of a network was transmitted using an unsecured protocol;
   determining that the request includes authentication credentials;
   determining, by a processing device, whether the authentication credentials are authentic; and
   in response to determining that the authentication credentials are authentic, denying the request to access the resource of the network, and disabling the authentication credentials.

2. The method of claim 1, wherein determining whether the authentication credentials are authentic comprises determining whether the authentication credentials match second authentication credentials of an identity associated with the resource using a security domain associated with the resource.

3. The method of claim 2, wherein the security domain is configured with access to a repository of identities associated with the resource, each of the identities in the repository including respective second authentication credentials.

4. The method of claim 1, wherein the authentication credentials are disabled without user input, the method further comprising:
   transmitting one or more notifications to an owner of the authentication credentials, the one or more notifications indicating that the authentication credentials have been disabled.

5. The method of claim 4, wherein the one or more notifications include a request to reset the authentication credentials.

6. The method of claim 1, wherein the unsecured protocol is a hypertext transfer protocol (HTTP).

7. The method of claim 1, wherein the authentication credentials comprise a user name and password.

8. A system comprising:
   a memory to store a resource of a network; and
   a processing device to:
      determine that a request to access the resource was transmitted using an unsecured protocol;
      determine that the request includes authentication credentials;
      determine whether the authentication credentials are authentic; and
      in response to determining that the authentication credentials are authentic, deny the request to access the resource of the network, and disable the authentication credentials.

9. The system of claim 8, wherein to determine whether the authentication credentials are authentic, the processing device is further to determine whether the authentication credentials match second authentication credentials of an identity associated with the resource using a security domain associated with the resource.

10. The system of claim 9, wherein the security domain is configured with access to a repository of identities associated with the resource, each of the identities in the repository including respective second authentication credentials.

11. The system of claim 8, wherein the authentication credentials are disabled without user input, and wherein the processing device is further to:

transmit one or more notifications to an owner of the authentication credentials, the one or more notifications indicating that the authentication credentials have been disabled.

12. The system of claim 11, wherein the one or more notifications include a request to reset the authentication credentials.

13. The system of claim 8, wherein the unsecured protocol is a hypertext transfer protocol (HTTP).

14. The system of claim 8, wherein the authentication credentials comprise a user name and password.

15. A non-transitory computer-readable storage medium including instructions that, when executed by a processing device, cause the processing device to:

determine that a request to access a resource of a network was transmitted using an unsecured protocol;

determine that the request includes authentication credentials;

determine, by the processing device, whether the authentication credentials are authentic; and in response to determining that the authentication credentials are authentic, deny the request to access the resource of the network, and disable the authentication credentials.

16. The non-transitory computer-readable storage medium of claim 15, wherein to determine whether the authentication credentials are authentic, the processing device is further to determine whether the authentication credentials match second authentication credentials of an identity associated with the resource using a security domain associated with the resource.

17. The non-transitory computer-readable storage medium of claim 16, wherein the security domain is configured with access to a repository of identities associated with the resource, each of the identities in the repository including respective second authentication credentials.

18. The non-transitory computer-readable storage medium of claim 15, wherein the authentication credentials are disabled without user input, and wherein the processing device is further to:

transmit one or more notifications to an owner of the authentication credentials, the one or more notifications indicating that the authentication credentials have been disabled.

19. The non-transitory computer-readable storage medium of claim 18, wherein the one or more notifications include a request to reset the authentication credentials.

20. The non-transitory computer-readable storage medium of claim 15, wherein the unsecured protocol is a hypertext transfer protocol (HTTP).

* * * * *